United States Patent [19]

Nakamura

[11] Patent Number: 4,890,103

[45] Date of Patent: Dec. 26, 1989

[54] RATE-OF-CLIMB INDICATOR

[75] Inventor: Shuji Nakamura, Komae, Japan

[73] Assignee: Tokyo Aircraft Instrument Co., Ltd., Tokyo, Japan

[21] Appl. No.: 729,158

[22] Filed: Apr. 30, 1985

[51] Int. Cl.$^4$ .................................. G01C 21/10
[52] U.S. Cl. ........................... 340/968; 73/178 T; 73/179; 340/971
[58] Field of Search ............... 340/963, 968–971, 340/977, 978, 945; 364/433; 73/178 T, 179, 178 R, 181, 182; 244/1 R, 166; 33/328, 354, 355, 358

[56] References Cited

U.S. PATENT DOCUMENTS

| | | | |
|---|---|---|---|
| 2,152,635 | 4/1939 | Crane et al. | 73/179 |
| 3,033,035 | 5/1962 | Snodgrass | 340/978 |
| 3,246,523 | 4/1966 | Richard | 73/179 |
| 3,369,397 | 2/1968 | Alth | 73/179 |
| 3,451,265 | 6/1969 | Ball | 73/179 |
| 3,778,760 | 12/1973 | Jayne | 340/970 |
| 4,043,194 | 8/1977 | Tanner | 340/968 |
| 4,086,810 | 5/1978 | Ball | 340/977 |
| 4,189,777 | 2/1980 | Kuntman | 340/968 |
| 4,229,725 | 10/1980 | Reilly | 73/178 T |
| 4,250,746 | 2/1981 | Vassie et al. | 73/178 T |
| 4,331,032 | 5/1982 | Sicre | 73/179 |
| 4,364,268 | 12/1982 | Zompolas | 73/178 R |

FOREIGN PATENT DOCUMENTS 0610855  10/1948  United Kingdom ................ 340/974

OTHER PUBLICATIONS

Stalker, E. A., *Principles of Flight*, N.Y., Ronald Press Company, 1931, p. 25–27, TL 545, 558.

Primary Examiner—Joseph A. Orsino
Assistant Examiner—Brent A. Swarthout
Attorney, Agent, or Firm—Spencer & Frank

[57] ABSTRACT

The rate-of-climb indicator of this invention can indicate the existence of wind shear. It comprises: a rate-of-climb capsule directly connected with the static pressure; a gear train which amplifies the displacement of the capsule; a rate-of climb pointer which indicates the amplified displacement, by rotation; a rate-of-speed pointer and its axle concentrically mounted with the rate-of-climb pointer; a rate-of-climb detecting side case containing therewithin the rate-of-climb capsule and the gear train, the rate-of-climb pointer and the rate-of speed pointer and its axle, the rate-of-climb detecting side case being connected with the static pressure through a capillary tube; a rate-of-speed capsule directly connected with the total pressure; a gear train for amplifying the displacement of the rate-of-speed capsule; an axle which transmits the amplified rotation; a rate-of-speed detecting side case containing the rate-of-speed capsule, the gear train, transmitting axle and being disposed to the case of the rate-of-climb detecting side through a wall face, the axes of the transmitting axle and the rate-of-speed pointer being made consistent with each other, and the rate-of-speed detecting side case being connected with the total pressure; and a non-contact rotation transmitting mechanism which transmits the rotation to the axle of the rate-of-speed pointer.

2 Claims, 5 Drawing Sheets

FIG. I(A)
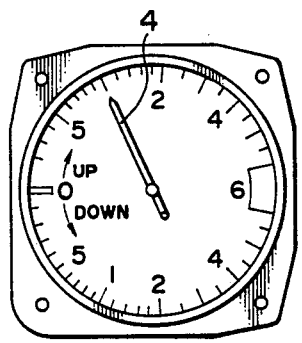
FIG. I(B)
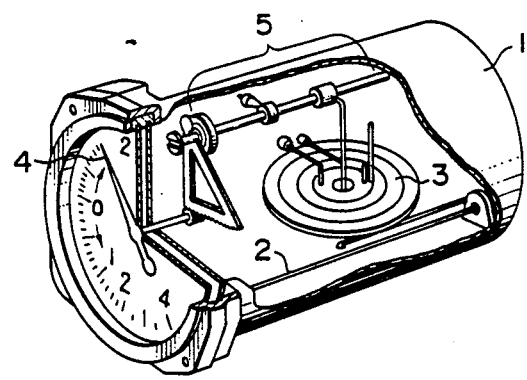

DESCENT DECREASING SPEED

TAKE OFF INCREASING SPEED

LEVEL FLIGHT

RATE-OF-CLIMB INDICATOR

BACKGROUND OF THE INVENTION

The present invention relates to a rate-of-climb indicator to be mounted in an airplane for maintaining level flight or a predetermined altitude change. More particularly, the invention relates to a rate-of-climb indicator for indicating the existence of any wind shear, and which can show the intensity of a gust and change of lift at the time of take-off or landing of the airplane.

In order to show the rate of altitude change for airplanes, a rate-of-climb indicator has conventionally been used. FIGS. 1(A) and 1(B) show an example of such a rate-of-climb indicator, FIG. 1(A) showing a front view thereof and FIG. 1(B) a partly broken perspective view of the indicator. In the conventional rate-of-climb indicator shown in these figures, a differential pressure is generated with the utilization of a capillary tube 2 and this is measured by a highly sensitive open-type capsule 3. The inner pressure within the capsule 3 varies according to the change of the static pressure connected to the capsule 3. On the other hand, the outer pressure of the capsule 3, that is the inner pressure of a case 1 changes gradually through the capillary tube 2. The displacement of the capsule 3 due to the differential pressure is transmitted to a pointer 4 through an amplifying mechanism 5.

With the above mentioned type rate-of-climb indicator, the rate of altitude change of the airplane can be known.

Even with the use of this kind of rate-of-climb indicator, an airplane flying at a low altitude might be exposed to an unexpected danger because of the existence of wind shear which suddenly changes its blowing directions. The problem of the influence of wind shear at the time of take-off and landing of the airplane is explained with reference to FIGS. 2(A) and 2(B).

FIG. 2(A) shows the landing of the airplane A. Assume that the airplane A, which has been in horizontal flight, starts descending from a point (a) for a landing strip G along a glide slope shown by the solid line. The airplane can land along the glide slope when there is no wind or when there is a constant wind speed condition. On the other hand, if a head wind occurs suddenly, the airspeed increases and the airplane lifts over the glide slope as shown in the dotted line (b). In case the wind blows from behind the airplane, the airplane flies under the glide slope as shown in the dotted line (c).

FIG. 2(B) shows the take-off of the airplane. If the airplane A which took-off at the point (d) receives a sudden wind from behind, its body is lowered from the solid line of the figure, as shown in (e). When the wind changes direction and the airplane receives a head wind, its body lifts as shown in the dotted line (f).

A sudden lift or lowering at the time of landing or take-off of the airplane is very dangerous, and might be the cause of many airplane accidents.

SUMMARY OF THE INVENTION

An object of this invention is therefore to provide a rate-of-climb indicator for indicating the existence of wind shear, wherein any influence of a gust may be indicated to the pilot when there is a change of the airspeed.

The rate-of-climb indicator for indicating the existence of wind shear according to this invention comprises: a rate-of-climb capsule directly connected with the static pressure; a gear train which amplifies the displacement of the capsule; a rate-of-climb pointer which indicates the amplified displacement, by rotation; a rate-of-speed pointer; a rate-of-climb detecting side case containing therewithin the rate-of-climb capsule and the gear train, the rate-of-climb pointer and the rate-of-speed pointer and its axle, the rate-of-climb detecting side case being connected with the static pressure through a capillary tube; a rate-of-speed capsule directly connected with the total pressure; a gear train for amplifying the displacement of the rate-of-speed capsule; an axle which transmits the amplified rotation; a rate-of-speed detecting side case containing the rate-of-speed capsule, the gear train, transmitting axle and being disposed to the case of the rate-of-climb detecting side through a wall face, the axes of the transmitting axle and the rate-of-speed pointer being made consistent with each other, and the rate-of-speed detecting side case being connected with the total pressure; and a non-contact rotation transmitting mechanism which trasnmits the rotation to the axle of the rate-of-speed pointer.

BRIEF DESCRIPTION OF THE DRAWINGS

FIGS. 1(A) and 1(B) show an examnple of a conventional rate-of-climb indicator, FIG. 1(A) showing the front view thereof and FIG. 1(B) a partly broken perspective view of the indicator.

DESCRIPTION OF THE PREFERRED EMBODIMENT

Figure 3:
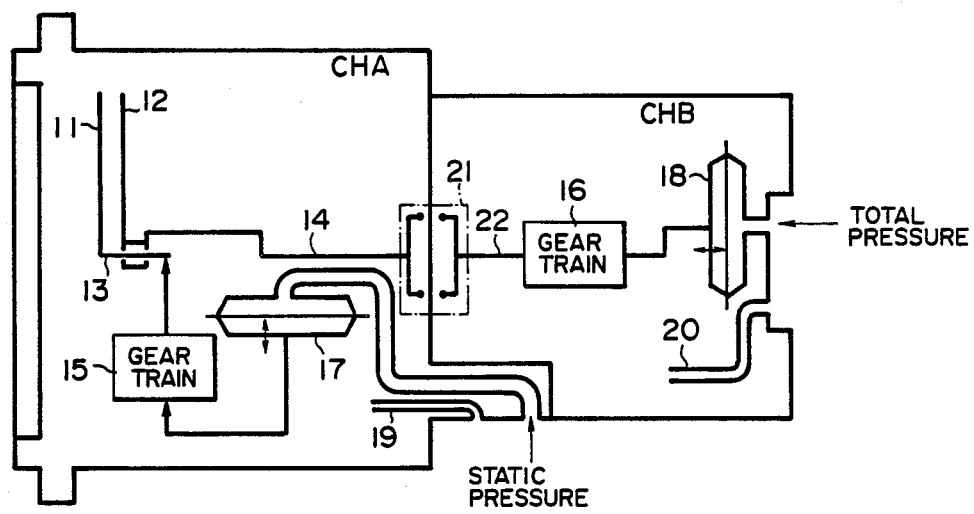
FIG. 3 is a schematic view showing an embodiment of the rate-of-climb indicator according to the present invention which can indicate the existence of wind shear.

FIG. 3 is a schematic diagram showing an embodiment of the rate-of-climb indicator according to this invention which can indicate the existence of any wind shear.

A sealed chamber CHA of a rate-of-climb indicator is formed with a case of the type shown in FIG. 1(B), and another sealed chamber CHB for a rate-of-speed indicator is provided at the rear of the chamber CHA.

The chamber CHA is connected to static pressure through a capillary tube 19. Within this chamber CHA, there are mounted a capsule 17 connected to the static pressure, a gear train 15 for amplifying the displacement of the capsule 17, an axle 13 to which the amplified rotation of the capsule 17 is transmitted, and a pointer 11 which is integrally mounted with the axle 13 and indicates the rate-of-climb. All are for the functioning of the rate-of-climb indicator itself. To be understood easily, the fundamental structure and operation of the rate-of-climb indicator are the same as the conventional rate-of-climb indicator.

In the sealed chamber CHA, a pointer 12 is further provided, which is concentrically rotatable with the pointer 11 for indicating the rate-of-speed, as well as an axle 14 for rotating the pointer 12.

The sealed chamber CHB for the rate-of-speed indicator is connected to the total pressure through a capillary tube 20. In the chamber CHB, there are mounted a capsule 18 connected to the total pressure, a gear train 16 for amplifying the displacement of the capsule 18 and an axle 22 to which the amplified rotation is transmitted.

The sealed chambers CHA and CHB are separated by a boundary wall consisting of a thin non-magnetic material. In order to transmit the rotation of the axle 22 provided at the side of the rate-of-speed indicator chamber to the axle 14 in the chamber CHA for the rate-of-climb indicator through this boundary wall, a non-contact rotation transmitting mechanism 21 is provided. This non-contact rotation transmitting mechanism 21 consists of a driving permanent magnet piece connected to the axle 22 and a driven permanent magnet piece connected to the axle 14, and the rotation of the axle 14 follows that of the axle 22.

The operation of the embodiment and its further detailed structure is explained hereinafter.

Figure 4:
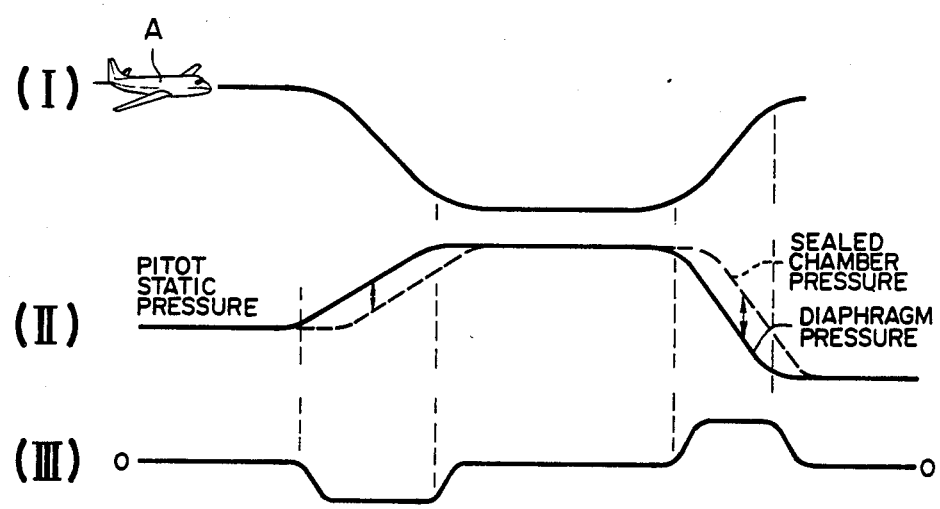
FIG. 4 is a graph for explaining the operation of the rate-of-climb indicator shown in FIG. 3.

The change of the altitude of an airplane A is shown in (I) of FIG. 4. When the altitude becomes low, the pressure within the capsule 17, that is the static pressure, becomes high. This change of pressure is shown by a solid line in (II) of FIG. 4. Due to the influence of the capillary tube, the pressure within the sealed chamber CHA changes, but it follows only after a lapse of time from the change of pressure within the capsule 17 as shown by the dotted line in (II) of FIG. 4.

The difference of pressure between the capsule 17 and the chamber CHA is shown by (III) of FIG. 4. If this difference of pressure exists, the capsule 17 displaces, which is amplified by the gear train 15 to rotate the pointer 11.

The pointer 11 is set to point to the position of nine o'clock, when the difference of pressure between the capsule 17 and CHA shown in (III) of FIG. 4 is zero. If the pointer 11 points to this position, it indicates that the airplane is in level flight without any change of altitude. The pointer 11 is thus set to indicate the climbing condition of the airplane when it moves in the clockwise direction from the position of nine o'clock, and its descending condition at its counter-clockwise movement therefrom.

The static pressure is connected to the chamber CHA and the capsule 17, while the total pressure (static pressure + dynamic pressure) is connected to the chamber CHB and the capsule 18.

The airspeed is shown by the difference between the dynamic pressure and the static pressure. If the difference of the static pressure at the time of landing or take-off of the airplane may be ignored, it can be said that the displacement of the capsule 18 represents the rate of change of the airspeed.

The pointer 12 is set to the displaced position of nine o'clock when the rate of change of the airspeed is at the zero point. Accordingly, when the airspeed of the airplane is increasing, the pointer 12 moves in the clockwise direction, while it is rotated in the counter-clockwise direction when the airspeed is decreasing.

The sensitivity of the rate-of-climb indicator and the sensitivity of the rate-of-speed indicator are set so that the angle of deflection of the standard climbing speed (500 ft/minute) shown by the rate-of-climb indicator is equal to that of the standard speed reduction rate shown by the rate-of-speed indicator at the time of landing.

Figure 5:
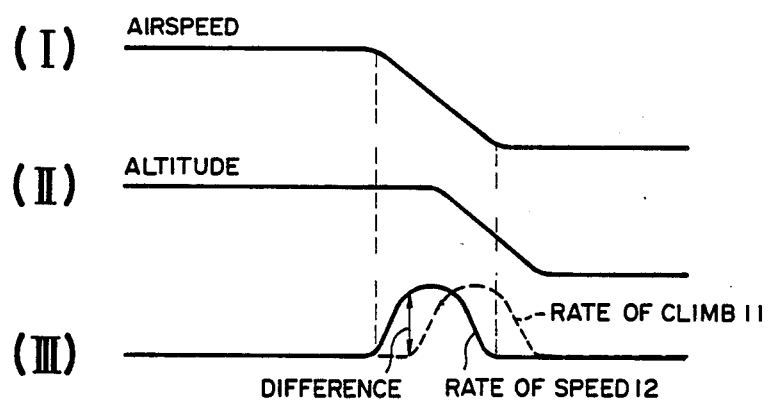
FIG. 5 is a graph explaining the changes of indication representing the change of the airspeed and the change of the altitude of the airplane.

Even if the airspeed of the airplane changes suddenly for example because of wind shear, the change of the altitude of the airplane follows after some time, due to the inertia of the airplane. In (I) and (II) of FIG. 5, the changes of the airspeed and the altitude are respectively shown. The rate-of-speed indicator follows the change of the airspeed as shown in the solid line of (III) of FIG. 5, while the rate-of-climb indicator changes as shown in the dotted line therein. Thus the indicated values at the time of change of the airspeed differ from each other.

Examples of indication of the rate-of-climb indicator and the rate-of-speed indicator are explained with reference to FIGS. 6(A) to 6(G), as to the conditions explained with reference to FIGS. 2(A) and 2(B). The pointer 11 of the rate-of-climb indicator is shown in FIGS. 6A to 6G by a solid in real line, while the pointer 12 of the rate-of-speed indicator is shown by a dotted line.

Figure 2A:
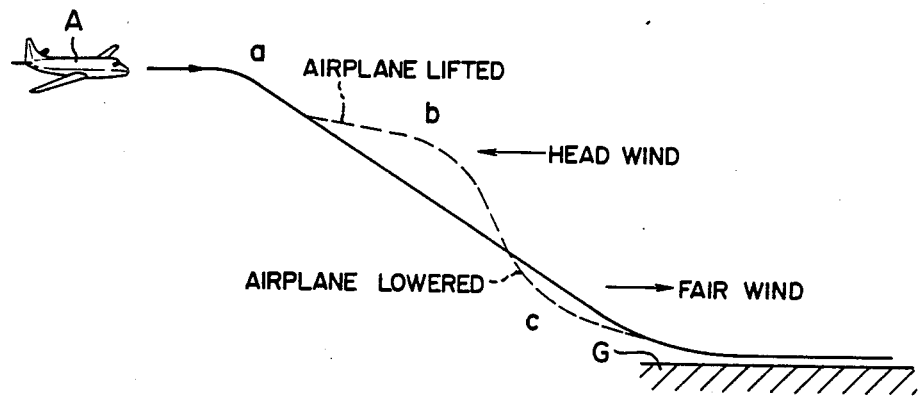
FIGS. 2(A) and 2(B) are schematic views for explaining the influence of any wind shear at the time of landing and take-off of an airplane, respectively.
Figure 6A:
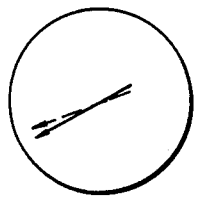
FIGS. 6A to 6G are schematic diagrams showing examples of indications obtained with the device according to this invention.

At the start of a descent from the point (a) of FIG. 2(A), if the rate of reduction of speed is of standard value, the pointer of the rate-of-speed indicator is directly under the pointer of the rate-of-climb indicator, which is shown somewhat displaced in FIG. 6(A) to clearly show the relation between the two pointers.

When the pointer of the rate-of-climb indicator shows its standard rate of climbing (landing) speed and the pointer of the rate-of-speed indicator is directly under the pointer of the rate-of-speed indicator, conditions are appropriate for an ideal landing.

Figure 6B:
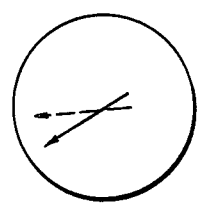

At the condition just before (b) of FIG. 2(A), that is just before the airplane is forced to lift, the pointer of the rate-of-speed indicator moves in the direction indicating an increase in the speed of the airplane, as shown in FIG. 6(B). The pilot can understand this movement as indicating the generation of a head wind to the airplane.

Figure 6C:
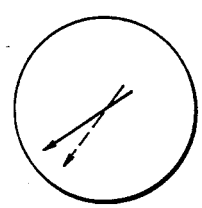

At the condition just before (c) of FIG. 2(A), that is just before the altitude of the airplane is decreased, the pointer of the rate-of-speed indicator moves in the speed reducing direction, as shown in FIG. 6(C). The pilot can understand from this that a fair wind has been generated.

Figure 2B:
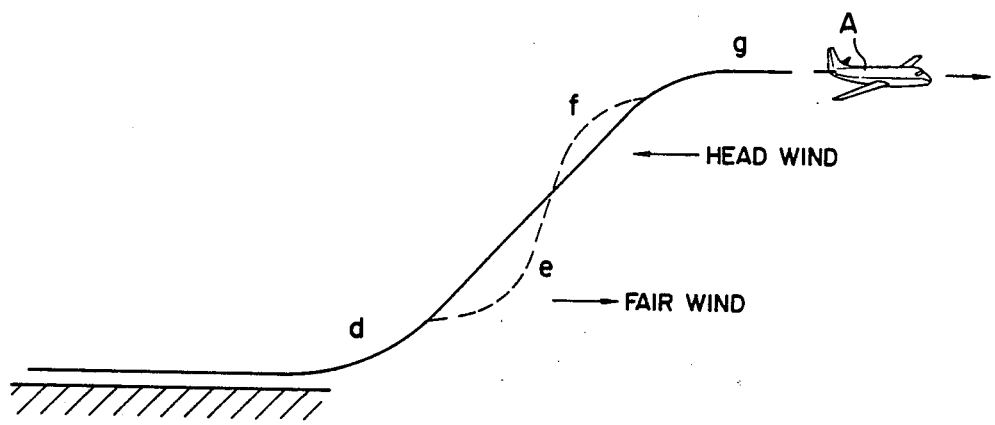
Figure 6D:
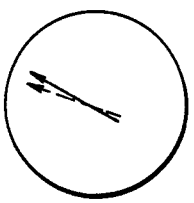

The pattern of FIG. 6(D) represents the speed increasing state just after take-off of the airplane shown in (d) of FIG. 2(B), in which the pointers move in the clockwise direction, that is, they indicate an increase of both the altitude and speed of the airplane.

Figure 6E:
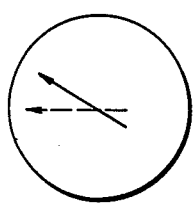
Figure 6F:
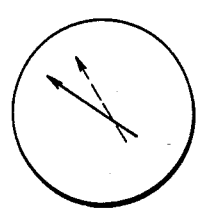
Figure 6G:
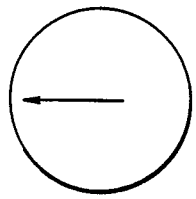

Just before the time (e) of FIG. 2(B), that is, the state in which the fair wind starts to blow and just before the descent of the airplane, the pointer of the rate-of-speed indicator moves in the speed reducing direction as shown in FIG. 6(E). The pilot at this state can see the existence of the fair wind.

Just before the state shown at (f) of FIG. 2(B), a head wind is generated, but the airplane is not yet lifted. In this state, the pointer of the rate-of-speed indicator moves in the speed increasing direction. The pilot can see at this state the existence of the head wind.

When the airplane finishes climbing and starts its cruising flight state, the pointers are in the same position of nine o'clock and stop there.

As fully explained above, according to the embodiment of this invention, the pointers for the rate-of-speed indicator and the rate-of-climb indicator are rotated concentrically, and therefore the indicator lets the pilot know of the generation of wind shear before the generation of any fluctuation to the airplane. Thus the pilot can promptly make any necessary control of the lift against the airspeed of the airplane.

It will be realized that the rate-of-climb indicator according to this invention is very simple in structure and therefore can be manufactured at low cost.

Replacement of any conventional rate-of-climb indicator is very easy.

What is claimed is:

1. A rate-of-climb indicator for indicating the intensity of wind shear encountered during the flight of an airplane, comprising:
   a first sealed chamber for providing an indication of the rate-of-climb of said airplane, said first chamber including
      a rate-of-climb capsule directly connected to a source of static pressure;
      a first gear train coupled to said rate-of-climb capsule for amplifying the displacement thereof;
      a rate-of-climb pointer rotatably mounted on a first axle connected to said first gear train, said rate-of-climb pointer indicating by the rotation thereof the amplified displacement of said rate of climb capsule;
      a rate-of-speed pointer rotatably mounted on a second axle for rotation concentric with the rotation of said rate-of-climb pointer; and
      capillary tube means connecting the interior of said first sealed chamber to said source of static pressure;
   a second sealed chamber for providing an indication of the rate-of-speed of said airplane, said second chamber being separated from said first chamber by a common non-magnetic partition and including
      a rate-of-speed capsule directly connected to a source of total pressure;
      a second gear train coupled to said rate-of-speed capsule for amplifying the displacement thereof;
      a third axle connected to said second gear train; and
      means for connecting the interior of said second sealed chamber to said source of total pressure; and
   a non-contact rotation transmitting mechanism comprising first and second permanent magnets positioned on either side of said common partition, said first permanent magnet being coupled to said second axle and said second permanent magnet being coupled to said third axle, whereby the amplified displacement of said rate-of-speed capsule is transmitted to said rate-of-speed pointer.

2. A rate-of-climb indicator according to claim 1, wherein the angle of deflection of the standard climbing speed shown by the rate-of-climb indicator is equal to that of the standard speed reduction rate shown by the rate-of-speed indicator at the time of landing.

* * * * *